(12) United States Patent
Miyanari

(10) Patent No.: US 8,284,303 B2
(45) Date of Patent: Oct. 9, 2012

(54) IMAGING APPARATUS

(75) Inventor: Hiroshi Miyanari, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1430 days.

(21) Appl. No.: 11/625,690

(22) Filed: Jan. 22, 2007

(65) Prior Publication Data

US 2007/0195192 A1    Aug. 23, 2007

(30) Foreign Application Priority Data

Feb. 9, 2006    (JP) .................................. 2006-032504

(51) Int. Cl.
*H04N 5/225* (2006.01)
*G03B 7/26* (2006.01)

(52) U.S. Cl. ........................................ 348/372; 396/302

(58) Field of Classification Search ............. 348/231.99, 348/372, 244, 373, 375, 376, 374; 713/324; 396/302

See application file for complete search history.

(56) References Cited

U.S. PATENT DOCUMENTS

| | | | |
|---|---|---|---|
| 6,545,775 B1 * | 4/2003 | Watanabe et al. | 358/442 |
| 6,628,337 B1 * | 9/2003 | Yoshida | 348/372 |
| 7,179,608 B2 * | 2/2007 | O'Reilly et al. | 435/7.1 |
| 7,312,826 B2 * | 12/2007 | Ishii | 348/312 |
| 2004/0125421 A1 | 7/2004 | Sato | |
| 2004/0160525 A1 * | 8/2004 | Kingetsu et al. | 348/364 |

FOREIGN PATENT DOCUMENTS

| | | |
|---|---|---|
| JP | 09-163218 A | 6/1997 |
| JP | 2000-115642 A | 4/2000 |
| JP | 2003-298944 A | 10/2003 |
| JP | 2004-112422 A | 4/2004 |
| JP | 2005-223588 A | 8/2005 |

* cited by examiner

*Primary Examiner* — Chieh M Fan
*Assistant Examiner* — Ahmed A Berhan
(74) *Attorney, Agent, or Firm* — Canon USA Inc IP Division

(57) ABSTRACT

An imaging apparatus is provided which includes an image sensor including a plurality of photoelectric conversion units, an output unit configured to output a signal from the plurality of photoelectric conversion units, and a reading unit configured to read the signal from the plurality of photoelectric conversion units via the output unit, a display unit configured to display image data from the image sensor, and a control unit configured to control a first operation in which image data serially read from the image sensor is displayed by the display unit as a serial image and a second operation in which a still image is shot according to an instruction for picking up the still image while the first operation is being performed, and further configured to restrain/inhibit supplying power to the output unit at a predetermined timing during a time period in which the first operation is being performed.

9 Claims, 8 Drawing Sheets

IMAGING APPARATUS

BACKGROUND OF THE INVENTION

1. Field of the Invention

The present invention relates to an imaging apparatus configured to pick up an image of an object.

2. Description of the Related Art

In shooting a still image with an imaging apparatus such as a digital camera and a video camera, in order to confirm an object to be shot in a still image, image data serially read from an image sensor such as a complementary metal-oxide semiconductor (CMOS) image sensor, is displayed by an image display unit as a serial image.

In this state, a photographer half presses a shutter button and then an operation such as focusing is performed. After that, the photographer fully presses the shutter button to photograph a still image (see, for example, Japanese Patent Application Laid-Open No. 2005-223588, Japanese Patent Application Laid-Open No. 09-163218, and Japanese Patent Application Laid-Open No. 2000-115642).

An image sensor such as a CMOS image sensor includes an output amplifier that amplifies and outputs signals from a plurality of photoelectric conversion units. Until a still image shooting is performed, image data serially read from the image sensor is displayed by an image display unit as a serial image, and accordingly, power is continuously supplied to the output amplifier for that period of time. Thus, a temperature of the image sensor keeps rising. In the image sensor, an effect of dark current increases as the length of a time period starting with resetting of photoelectric conversion units and ending at reading of signals from the image sensor becomes longer. Especially in a state where the temperature of the image sensor is high, an effect of dark current is significant.

That is, when the temperature of an image sensor is high before an operation for shooting a still image is started, a still image obtained by performing a still image shooting operation is affected by dark current.

In shooting a still image, a very large number of signals are read from an image sensor, and accordingly, a time period starting with resetting of photoelectric conversion units and ending at reading of signals from the image sensor becomes long. In addition, when a long time exposure (shooting whose accumulation time is long) is performed, a time period starting with resetting of photoelectric conversion units and ending at reading of signals from an image sensor becomes very long, and accordingly, dark current significantly affects an image.

SUMMARY OF THE INVENTION

At least one exemplary embodiment is directed to suppressing an effect of dark current at the time of shooting a still image so as to obtain a high quality still image.

According to an aspect of the present invention, an imaging apparatus includes an image sensor including a plurality of photoelectric conversion units, an output unit configured to output a signal from the plurality of photoelectric conversion units, and a reading unit configured to read the signal from the plurality of photoelectric conversion units via the output unit; a display unit configured to display image data from the image sensor; and a control unit configured to control a first operation in which image data serially read from the image sensor is displayed by the display unit as a serial image and a second operation in which, a still image is shot according to an instruction for picking up the still image while the first operation is being performed, and further configured to restrain/inhibit supplying power to the output unit at a predetermined timing during a time period in which the first operation is being performed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features and aspects of the present invention will now herein be described in detail with reference to the drawings. It is noted that the relative arrangement of the components, the numerical expressions, and numerical values set forth in these embodiments are not intended to limit the scope of the present invention unless it is specifically stated otherwise.

First Exemplary Embodiment

Figure 1:
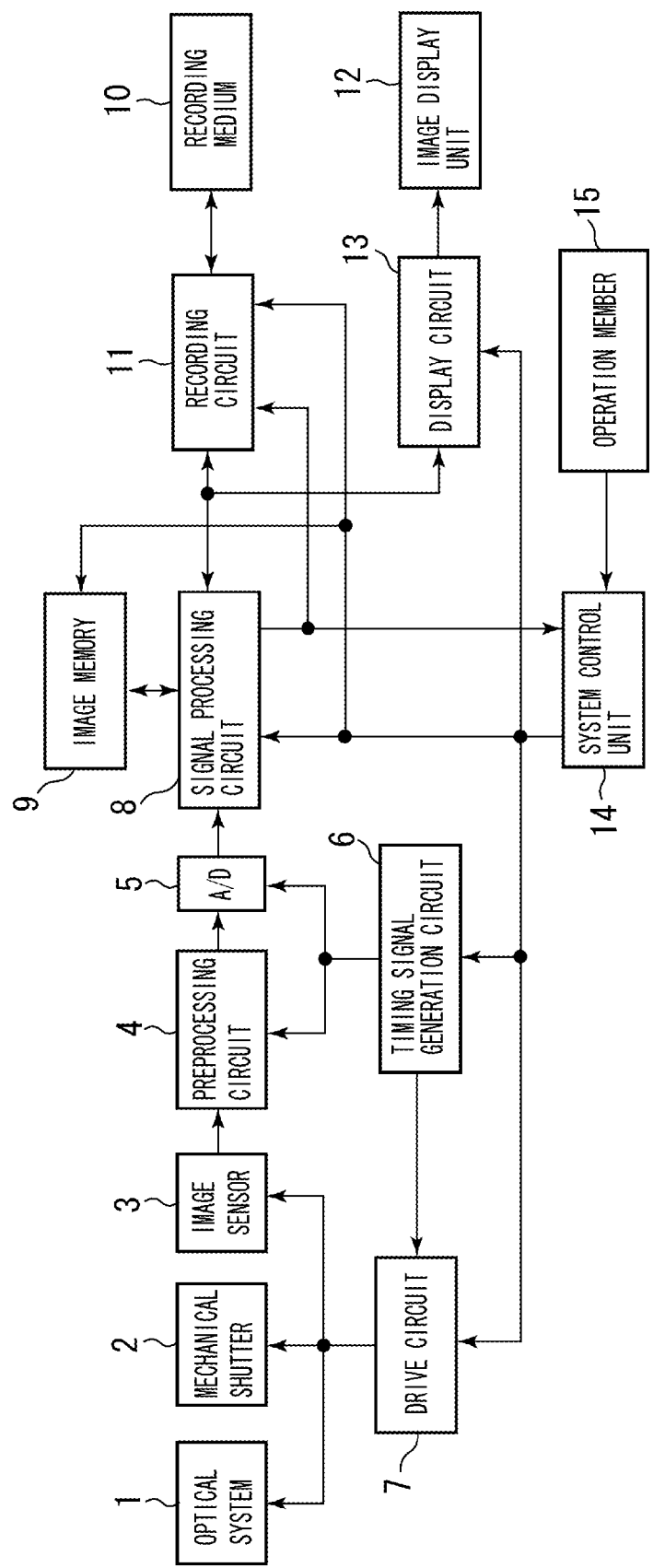
FIG. 1 illustrates an imaging apparatus according to a first exemplary embodiment and a second exemplary embodiment of the present invention.

FIG. 1 is a block diagram illustrating an example imaging apparatus according to a first exemplary embodiment of the present invention.

Referring to FIG. 1, the imaging apparatus includes an optical system 1 that includes a lens and a diaphragm. In addition, the imaging apparatus includes a mechanical shutter 2 and an image sensor (e.g., a CMOS image sensor) 3. A preprocessing circuit 4 includes a variable gain amplifier for variably amplifying signals from the image sensor 3. An analog/digital (A/D) converter 5 converts an analog signal into a digital signal. A timing signal generation circuit 6 generates a signal for operating the preprocessing circuit 4 and the A/D converter 5.

A drive circuit 7 drives the optical system 1, the mechanical shutter 2, and the image sensor 3. A signal processing circuit 8 performs signal processing necessary for photographed image data. An image memory 9 stores signal-processed image data. A recording medium 10 can be removed from the imaging apparatus. A recording circuit 11 records the signal-processed image data on the recording medium 10. An image display unit 12 displays the signal-processed image data. A display circuit 13 displays an image on the image display unit 12. A system control unit 14 controls the entire imaging apparatus.

An operation member 15 is a member for operation by a photographer. More specifically, the operation member 15 includes a shutter switch for starting a still image shooting operation, a moving image shooting button for starting a moving image shooting operation, a mode dial for switching among a still image shooting mode, a moving image shooting mode, and turning-off of power, an International Organization for Standardization (ISO) sensitivity setting member for setting an ISO sensitivity, and an accumulation time setting member for setting an accumulation time for accumulating photocharge by the image sensor 3.

Figure 2:
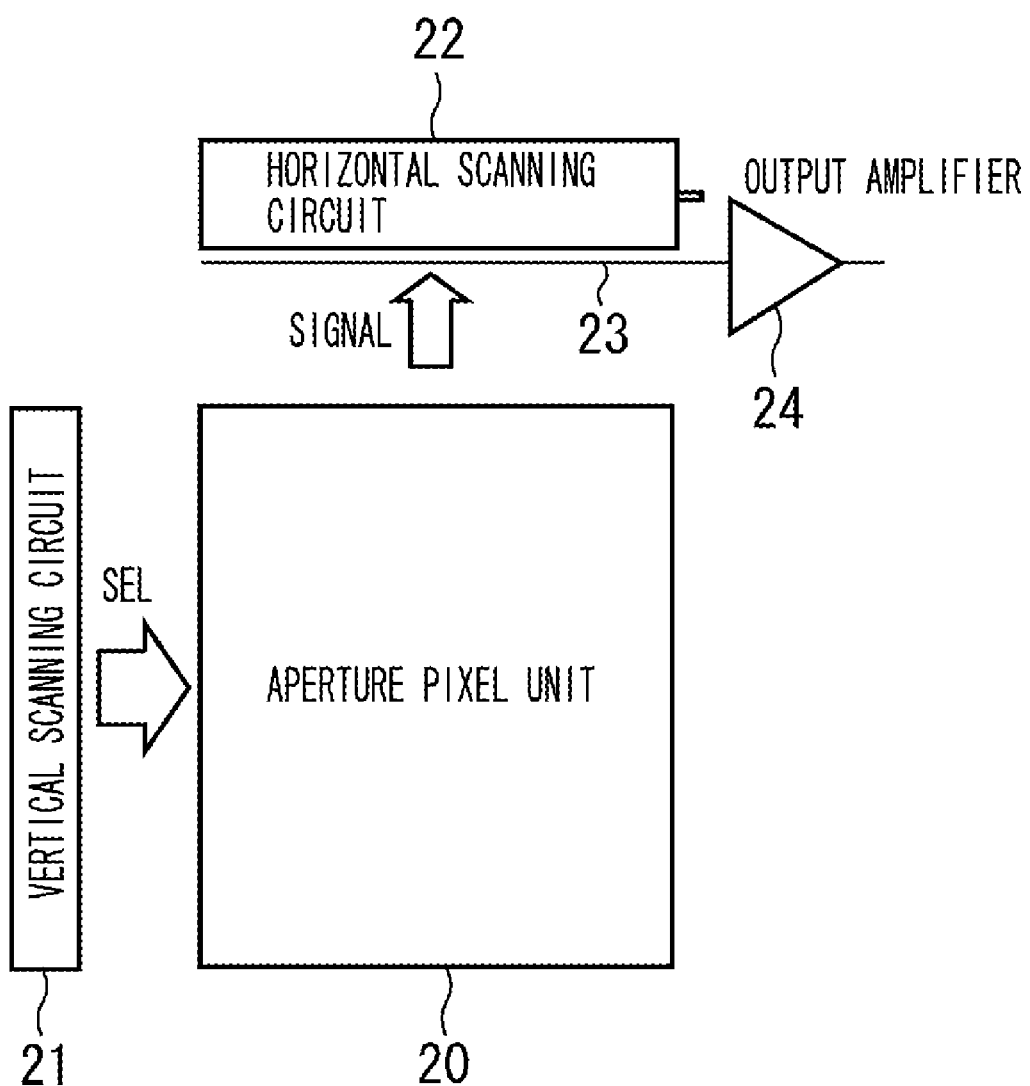
FIG. 2 illustrates an image sensor according to an exemplary embodiment of the present invention.

FIG. 2 illustrates a detailed exemplary configuration of the image sensor 3. An aperture pixel unit 20 includes two-dimensionally arranged photoelectric conversion units, which photoelectrically convert light (an object image) that is made incident via the lens 1 to generate signal charge. A vertical scanning circuit 21 scans the aperture pixel unit 20 in a vertical direction. The vertical scanning circuit 21 has a function for serially resetting the two-dimensionally arranged photoelectric conversion units line by line and a function for serially reading signals from the two-dimensionally arranged photoelectric conversion units onto a vertical output line, line by line. A horizontal scanning circuit 22, when scanning the aperture pixel unit 20 in a horizontal direction, serially reads signals from the aperture pixel unit 20 to an output amplifier 24 via a horizontal output line 23. The signals from the two-dimensionally arranged photoelectric conversion units are output to a portion external to the image sensor 3 via the output amplifier 24.

Figure 3:
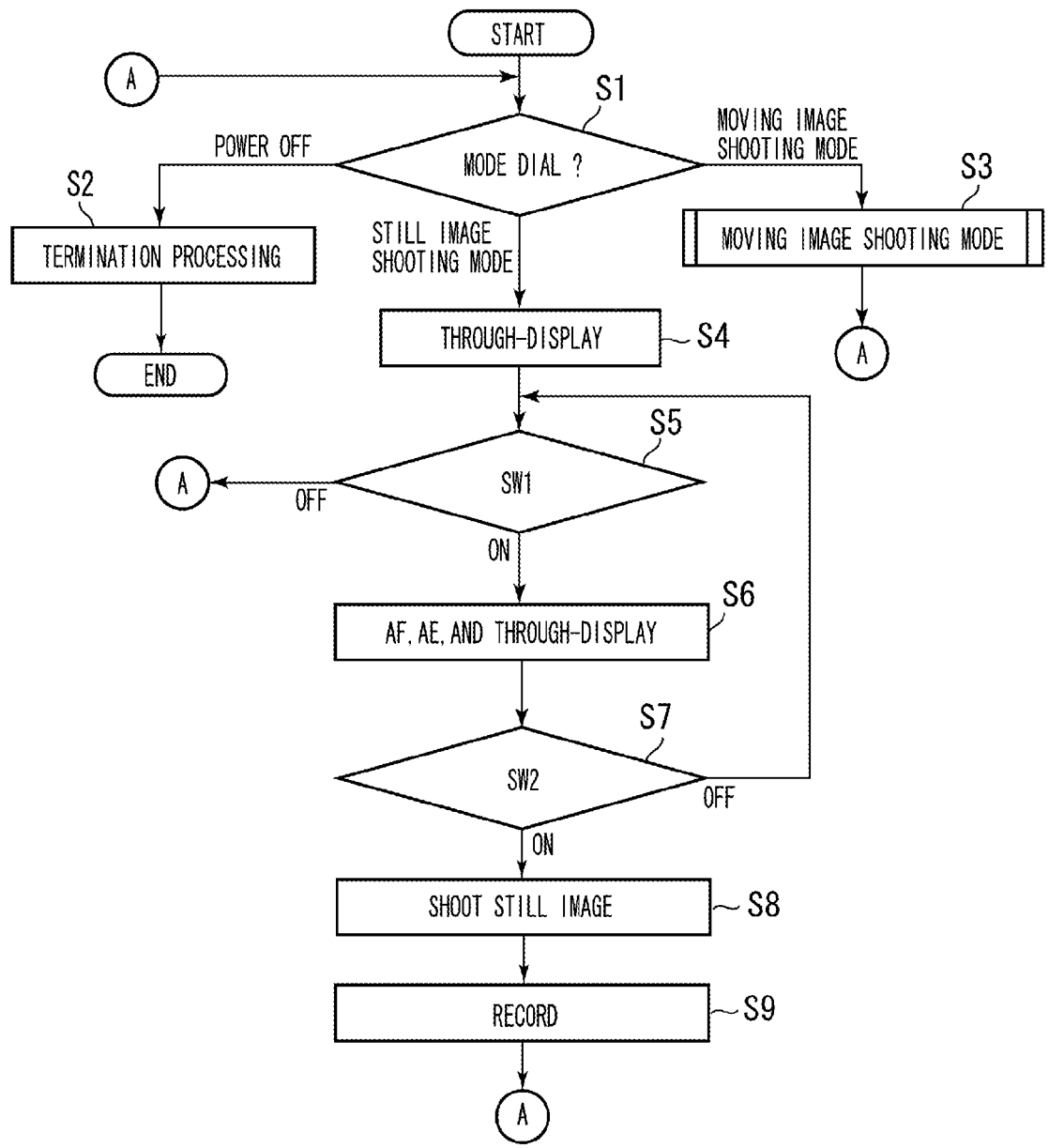
FIG. 3 is a flow chart illustrating an example flow of control implemented by a system control unit of the imaging apparatus according to the first exemplary embodiment of the present invention.

FIG. 3 is a flow chart illustrating an example flow of control performed by the system control unit 14 of the imaging apparatus according to the first exemplary embodiment.

Referring to FIG. 3, in step S1, the system control unit 14 determines at which position the mode dial is set. If it is determined that the mode dial is set to a power-off mode, then the system control unit 14 performs predetermined termination processing (step S2) for turning off power to each unit of the imaging apparatus, and then the processing ends.

In addition, if, in step S1, it is determined that the mode dial is set to a moving image shooting mode, the processing advances to step S3. The moving image shooting mode is described in detail later below. In addition, if, in step S1, it is determined that the mode dial is set to a still image shooting mode, the processing advances to step S4.

In step S4, the system control unit 14 sets the imaging apparatus to a through-display state in which image data serially read from the image sensor 3 is displayed by the image display unit 12 as a serial image. In the through-display state, image data is sequentially displayed by the image display unit 12 via the image sensor 3, the preprocessing circuit 4, the A/D converter 5, the signal processing circuit 8, and the display unit 13. Thus, an electronic viewfinder function is implemented.

In step S5, the system control unit 14 checks a state of a shutter switch SW1 (a state where the shutter switch is half pressed). If, in step S5, it is determined that the shutter switch SW1 is OFF, the processing returns to step S1. If, in step S5, it is determined that the shutter switch SW1 is ON, the processing advances to step S6.

In step S6, the system control unit 14 performs focusing processing to set a focus of the lens 1 on an object, and performs photometry processing to determine an aperture value and an accumulation time of the image sensor 3. In addition, in parallel to the focusing processing and the photometry processing, the system control unit 14 sets the imaging apparatus to the through-display state in which image data serially read from the image sensor 3 is displayed by the image display unit 12 as a serial image.

When the focusing/photometry/through-display processing in step S6 is completed, the processing advances to step S7. If, in step S7, a shutter switch SW2 (a state where the shutter switch is fully pressed) is not pressed (OFF in step S7) and the shutter switch SW1 is released (OFF in step S5), then the processing returns to step S1. If, in step S7, the shutter switch SW2 is not pressed (OFF in step 7) and the shutter switch SW1 remains ON, the processing returns to step S6. In addition, if the shutter switch SW2 is pressed in step S7 (ON in step S7), then the processing advances to step S8.

In step S8, a still image shooting operation is performed. More specifically, in step S8, first, all the pixels in the two-dimensionally arranged photoelectric conversion units of the image sensor 3 are reset to start accumulating photocharge in the image sensor 3. Then, when the accumulation time determined in the photometry processing in step S6 elapses, the mechanical shutter 2 is closed to shield the image sensor 3 from incident light. After that, signals from the two-dimensionally arranged photoelectric conversion units of the image sensor 3 are serially read out from the image sensor 3. At this time, if an accumulation time is set by the accumulation time setting member, photocharge is accumulated by the image sensor 3 in the set accumulation time. The mechanical shutter 2 can include a leading blade and a trailing blade. The mechanical shutter 2 can be arranged such that the mechanical shutter 2 is once made to be in a shielding state in which the leading blade and the trailing blade are closed, and then the leading blade is opened before the trailing blade is closed, so as to control the accumulation of photocharge based on a space between the leading blade and the trailing blade.

The system control unit 14 writes the photographed still image onto the image memory 9 via the image sensor 3, the preprocessing circuit 4, the A/D converter 5, and the signal processing circuit 8. In the preprocessing circuit 4, a signal is amplified at a gain corresponding to an ISO sensitivity set by the ISO sensitivity setting member.

After the shooting processing in step S8 is completed, the processing advances to step S9. In step S9, the system control unit 14 reads the still image written onto the image memory 9, performs image compression processing on the still image according to a set mode at the recording circuit 11, and then performs recording processing to write the still image onto the recording medium 10. After the recording processing in step S9 is completed, the processing returns to step S1.

The following is a description of driving of the image sensor 3 and supplying of power to the output amplifier 24 performed in the operation in step S4 or step S6 in which image data serially read from the image sensor 3 is displayed by the image display unit 12 as a serial image, according to the present exemplary embodiment.

Figure 4:
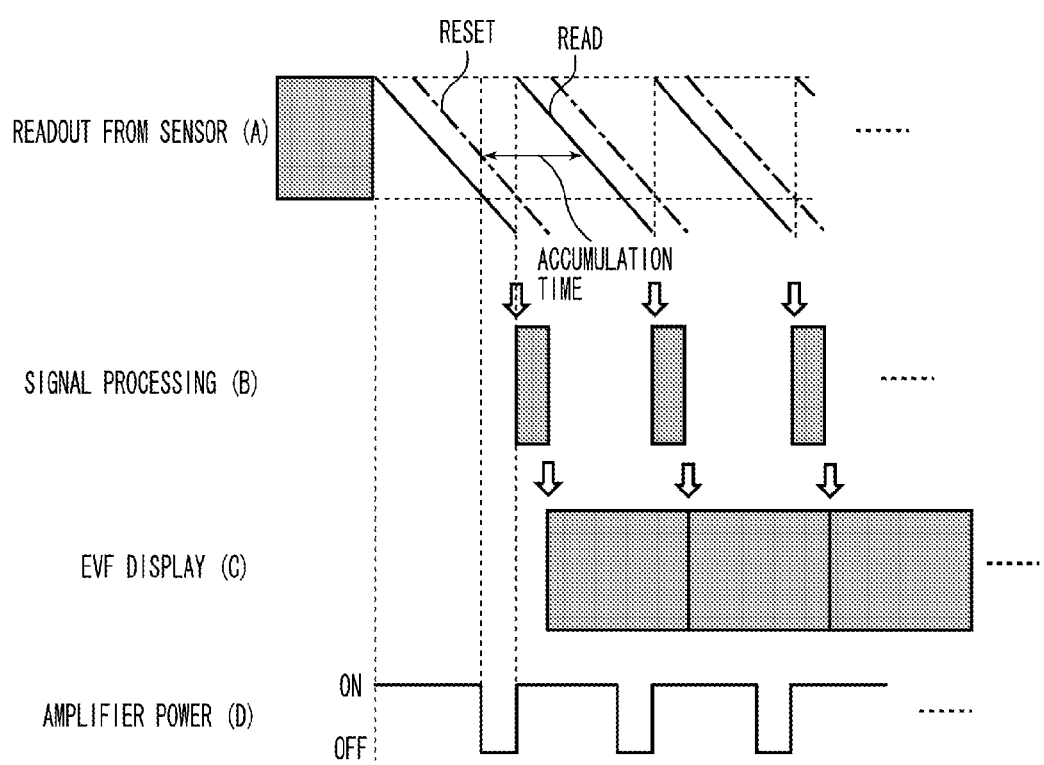
FIG. 4 is a timing chart illustrating exemplary driving of the image sensor, signal processing, displaying by an image display unit, and supplying of power to an output amplifier according to the first exemplary embodiment of the present invention.

FIG. 4 is a timing chart illustrating exemplary driving of the image sensor 3, signal processing, displaying by the image display unit 12, and supplying of power to the output amplifier 24. The image sensor 3 serially performs a rolling shutter driving in which the photoelectric conversion units are reset line by line and image data is serially read line by line (see (A) in FIG. 4). Then, the image data is signal-processed frame by frame and an image is continuously displayed by the image display unit 12 (see (B) and (C) in FIG. 4).

Here, signals from the photoelectric conversion units of the image sensor 3 are subjected to addition or thinning-out within the image sensor 3, and then are output from the image sensor 3. Thus, image data is read from the image sensor 3 in a smaller number of signals than the number of signals at the time of shooting a still image. Accordingly, the time required for reading image data can be shortened.

After the reading and scanning of the photoelectric conversion units for all the lines is completed, a dummy scanning of several lines (that is, a scanning in which reading of signals from the photoelectric conversion units is not performed) is performed, and after that, a reading and scanning for the next frame is started.

In other words, during a time period in which the dummy scanning is performed, the reading of signals from the photoelectric conversion units of the image sensor 3 is not performed. Accordingly, the system control unit 14 performs such control as not to supply power to the output amplifier 24 during that time period (see (D) in FIG. 4). With this control operation, an effective value of power consumption of the output amplifier 24 can be decreased. As the power consumption decreases, an increase in the temperature of the image sensor 3 can be alleviated.

Figure 5:
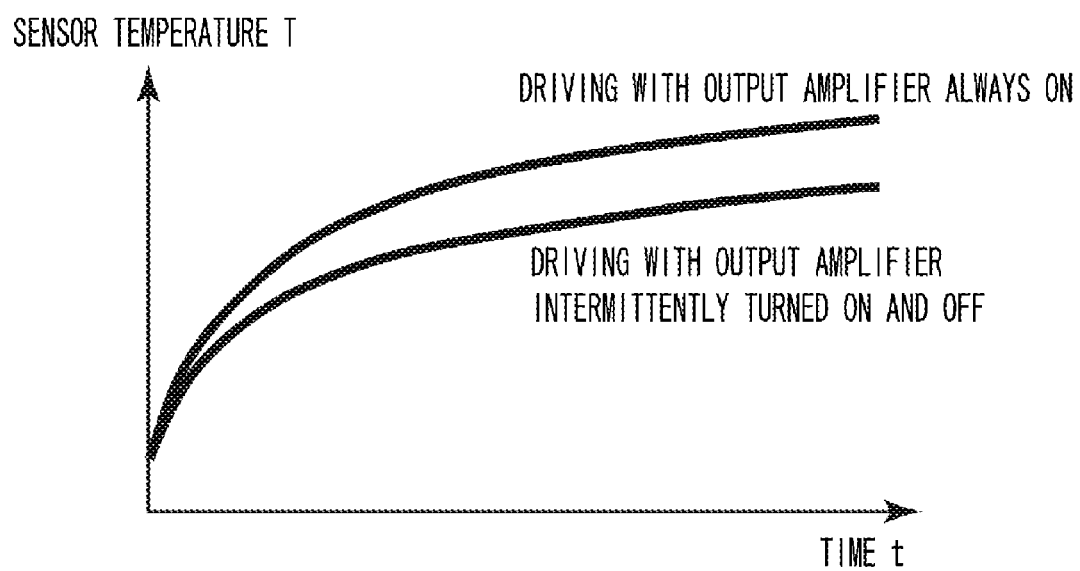
FIG. 5 illustrates an exemplary relationship between time and temperature with respect to the image sensor.

FIG. 5 schematically illustrates an increase in the temperature of the image sensor 3. Dark current occurring in the image sensor 3, which affects an image, has a mutual relationship with a temperature of the image sensor 3. That is, if the temperature of the image sensor 3 becomes high, the amount of dark current increases, and thus an image quality degrades. When a gain of the image sensor 3 is high (when the ISO sensitivity is set at a high level) or when the accumulation time is long (when a long accumulation time is set), dark current adversely affects an image.

During an operation for displaying image data serially read from the image sensor 3 on the image display unit 12 in step S4 or step S6, an accumulation time for one frame is in a range from several milliseconds to several tens of milliseconds. Accordingly, during this operation, dark current does not significantly affect an image. However, in shooting a still image after this operation, in the case of astrophotography, for example, the accumulation time becomes long and the gain used for the shooting is high. Accordingly, dark current significantly affects an image, and an image extremely degrades.

In the present exemplary embodiment, power is not supplied to the output amplifier 24 during a predetermined time period in which the operation for displaying image data serially read from the image sensor 3 on the image display unit 12 as a serial image is being performed. Accordingly, an increase in the temperature of the image sensor 3 can be alleviated, and thus the effects described above can be reduced.

Figure 6:
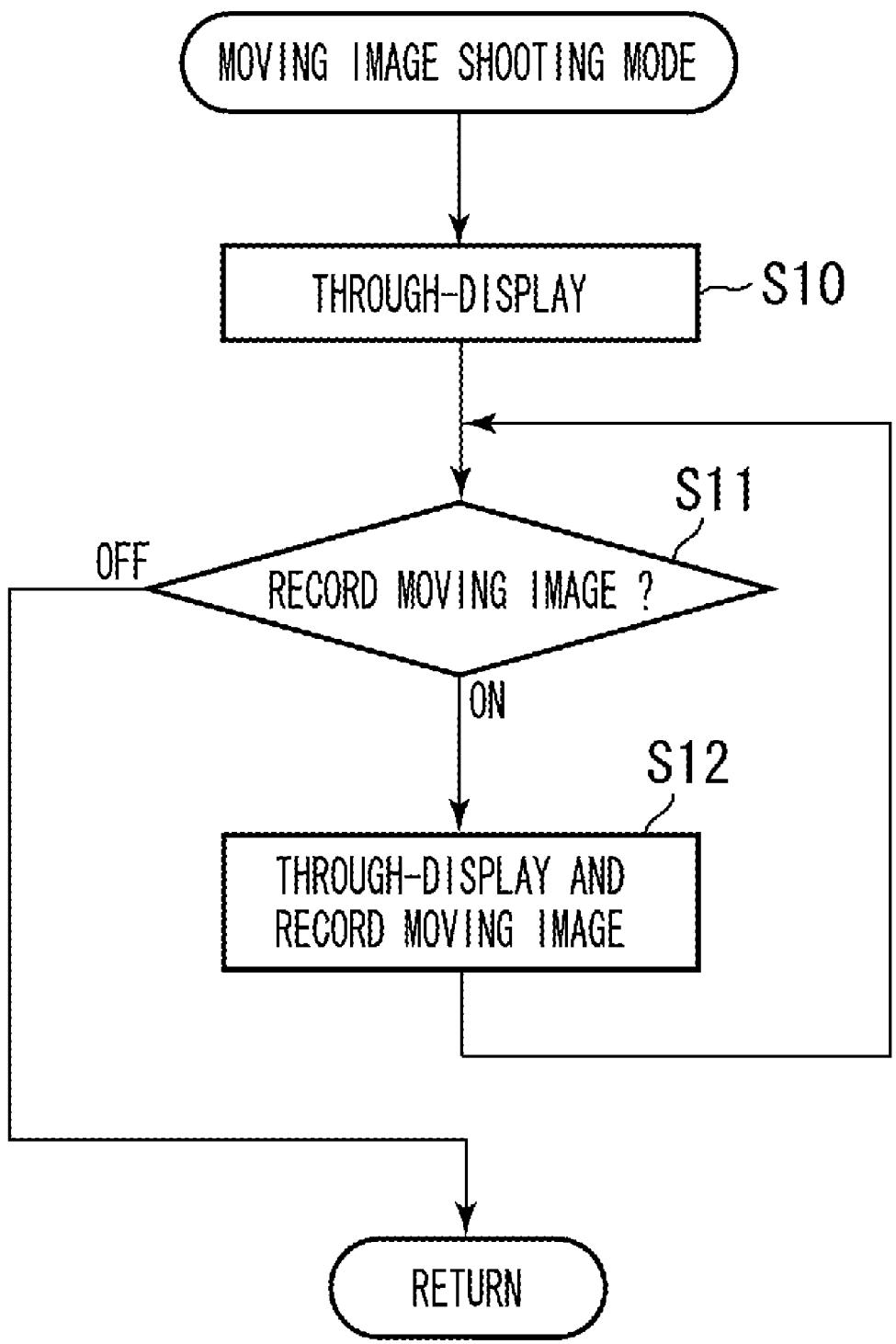
FIG. 6 is a flow chart illustrating an example of flow of control implemented by the system control unit according to the first exemplary embodiment of the present invention.

Now, an example moving image shooting mode in step S3 is specifically described below with reference to FIG. 6. When the moving image shooting mode is set, the system control unit 14, in step S10, sets the imaging apparatus to the through-display state in which image data serially read from the image sensor 3 is displayed by the image display unit 12 as a serial image. This operation is similar to the operation performed in step S4, and accordingly, a detailed description thereof is not repeated here.

Then, in step S11, when the moving image shooting button is pressed (when the imaging apparatus is set to a state in which a moving image recording is ON), the processing advances to step S12. In step S12, the system control unit 14 displays (through-displays) image data serially read from the image sensor 3 on the image display unit 12 as a serial image. In parallel to this processing, the system control unit 14, after performing compression processing of the serial image, performs processing for recording the compressed image on the recording medium 10.

In step S11, when the moving image shooting button is pressed (when the imaging apparatus is set to a state in which a moving image recording is OFF), the processing returns to step S1. During a time period in which the moving image shooting button is not pressed (in a state where the moving image recording is ON), the system control unit 14 repeats the processing for displaying image data serially read from the image sensor 3 on the image display unit 12 as a serial image, performing compression processing of the serial image, and recording the compressed image on the recording medium 10.

The following is a description of driving of the image sensor 3 and supplying of power to the output amplifier 24 performed during the operation for displaying image data serially read from the image sensor 3 on the image display unit 12 as a serial image in step S10 or step S12.

Figure 7:
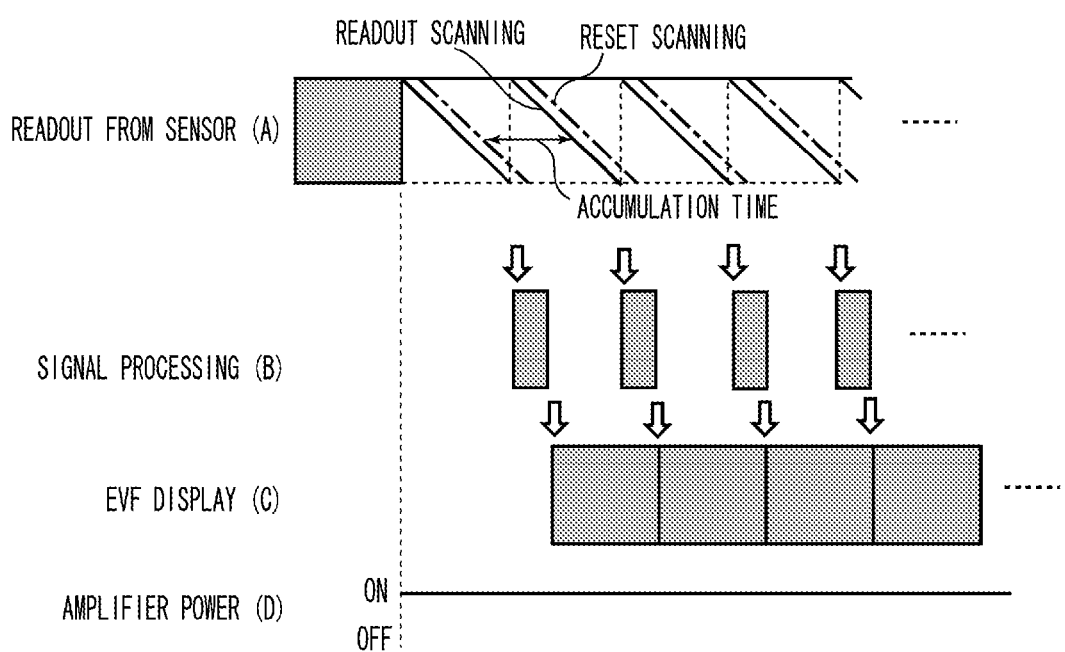
FIG. 7 is a timing chart illustrating exemplary driving of the image sensor, signal processing, displaying by the image display unit, and supplying of power to the output amplifier according to the first exemplary embodiment of the present invention.

FIG. 7 is a timing chart illustrating driving of the image sensor 3, signal processing, displaying of image data by the image display unit 12, and supplying of power to the output amplifier 24. The image sensor 3 serially performs a rolling shutter driving in which the photoelectric conversion units are reset line by line and image data is serially read line by line (see (A) in FIG. 7). Then, the image data is signal-processed frame by frame and an image is continuously displayed by the image display unit 12 (see (B) and (C) in FIG. 7).

Here, in the driving of the image sensor 3 in step S12, signals from the photoelectric conversion units of the image sensor 3 are subjected to addition or thinning-out within the image sensor 3, and then are output from the image sensor 3. Thus, the image data is read from the image sensor 3 in a smaller number of signals than at the time of shooting a still image, and accordingly, the time required for reading image data is shortened.

In other words, with respect to the driving of the image sensor 3 in step S12, a time required for reading signals from the image sensor 3 does not become long. In addition, the accumulation time is not extremely long and the signals are not amplified by the preprocessing circuit 4 at a high gain. Accordingly, an image does not suffer much affect of dark current.

Thus, the system control unit 14 performs such control as not to suspend supplying power to the output amplifier 24 at the time of operation in step S10 or step S12 ((D) in FIG. 7), and thus a frame rate is prioritized.

Second Exemplary Embodiment

Figure 8:
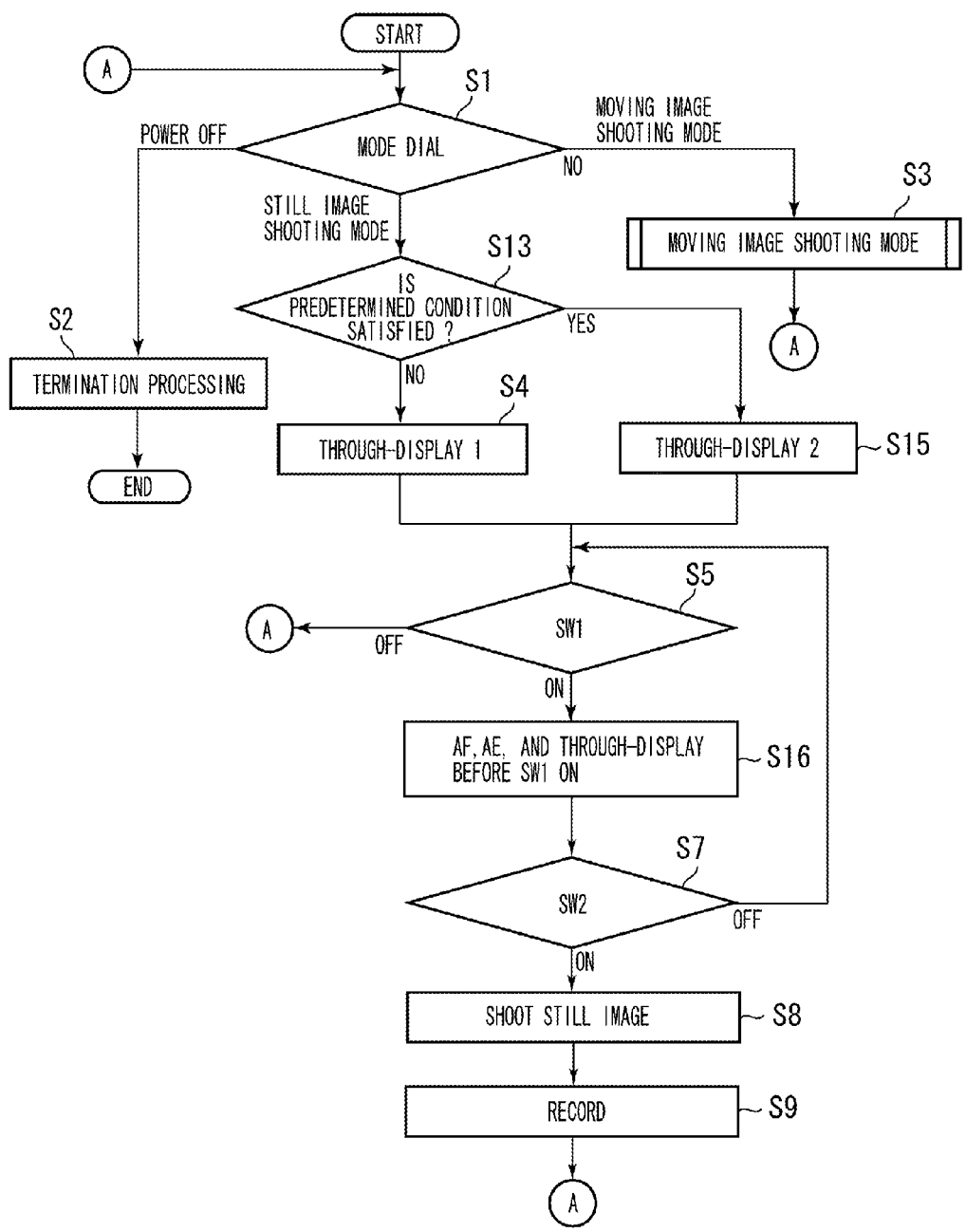
FIG. 8 is a flow chart illustrating an example flow of control implemented by a system control unit according to a second exemplary embodiment of the present invention.

FIG. 8 is a flow chart illustrating an example flow of control performed by the system control unit 14 of the imaging apparatus according to a second exemplary embodiment of the present invention. In FIG. 8, operations similar to those in the first exemplary embodiment are provided with the same step numbers, and a detailed description thereof is not repeated here.

In the first exemplary embodiment, in the through-display processing (step S4) performed in the still image shooting mode, the operation shown in FIG. 4 is always performed. In the second exemplary embodiment, the through-display processing is altered according to whether a predetermined condition is satisfied. Specific examples of the predetermined condition will be described later below.

In the second exemplary embodiment, in step S13, the system control unit 14 determines whether a predetermined condition is satisfied. If it is determined that the predetermined condition is not satisfied (NO in step S13), the processing advances to step S4. The operation in step S4 is similar to that described in the first exemplary embodiment, and accordingly, a description thereof is not repeated here. On the other hand, if it is determined that the predetermined condition is satisfied, the processing advances to step S15.

In step S15, the system control unit 14 performs the following processing. The length of a period of time during which power is not supplied to the output amplifier 24 is made long by making long the length of a time period starting from a time at which the serial reading of a preceding frame of the image sensor 3 line by line is completed and ending at a time at which the reading of the next frame line by line is started. Alternatively, the system control unit 14 performs control such that the reading of signals from the image sensor 3 is not performed every other several frames so as not to supply power to the output amplifier 24 during a time period in which the signals are not being read. In addition, instead of displaying the frame whose signals from the image sensor 3 are not read, the system control unit 14 displays an image of the preceding frame on the image display unit 12. That is, the system control unit 14 performs such control as to increase the ratio of the time period in which supplying power to the output amplifier 24 is being restrained (or inhibited) during the time period in which image data serially read from the image sensor 3 is displayed by the image display unit 12 as a serial image.

With the processing described above, the length of the time period in which power is not supplied to the output amplifier 24 according to the processing in step S15 can be made longer than the length of the time period in which power is not supplied to the output amplifier 24 according to the processing in step S4.

Now, specific examples of the predetermined condition are described below. The signal processing circuit 8 detects a movement of an object whose image is picked up so as to determine whether the movement of the object is smaller than a predetermined level. If it is determined that the movement of the object is smaller than the predetermined level (YES in step S13 in FIG. 8), then the processing advances to step S15. This is because when the movement of the object is small, even if a frame rate becomes low or if a preceding frame is displayed instead of a certain frame, an image does not suffer a significant affect thereof.

Alternatively, the signal processing circuit 8 determines whether a focusing operation is being performed. If it is determined that a focusing operation is being performed (YES in step S13 in FIG. 8), the processing advances to step S15. This is because while a focusing operation is being performed, the movement of an object is small in most cases, and accordingly, even if a frame rate becomes low or if a preceding frame is displayed instead of a certain frame, an image does not suffer a significant affect thereof.

Alternatively, the signal processing circuit 8 determines whether a luminance level is low. If it is determined that the luminance level of an object is lower than a predetermined level (YES in step S13 in FIG. 8), the processing advances to step S15. This is because when a luminance level is low, it is highly likely that a nightscape shooting or an astrophotography is being performed, in which the movement of an object is small in most cases. Accordingly, even if a frame rate becomes low or if a preceding frame is displayed instead of a certain frame, an image does not suffer a significant affect thereof.

Alternatively, the signal processing circuit 8 determines whether the time taken for displaying image data serially read from the image sensor 3 on the image display unit 12 as a serial image is longer than a predetermined time period. If it is determined that the time taken for displaying image data serially read from the image sensor 3 on the image display unit 12 as a serial image is longer than a predetermined time period (YES in step S13 in FIG. 8), the temperature of the image sensor 3 may have increased. Accordingly, in step S15, the system control unit 14 performs such control as to lower a frame rate or to display a preceding frame instead of a certain frame. Thus, the time period in which power is not supplied to the output amplifier 24 can be made long, and accordingly, an increase in the temperature of the image sensor 3 can be reduced.

Alternatively, a sensor for measuring the temperature of the image sensor 3 is provided in the imaging apparatus so that the signal processing circuit 8 can measure the temperature of the image sensor 3 and determine whether the temperature of the image sensor 3 exceeds a predetermined level. If it is determined that the temperature of the image sensor 3 is higher than the predetermined temperature level (YES in step S13 in FIG. 8), in step S15, the system control unit 14 performs such control as to lower a frame rate or to display a preceding frame instead of a certain frame. Thus, the time period in which power is not supplied to the output amplifier 24 can be made long, and accordingly, an increase in the temperature of the image sensor 3 can be reduced.

The measurement of the temperature is not limited to measuring the temperature of the image sensor 3. That is, a temperature of another member in the imaging apparatus can be measured. Alternatively, a temperature around the imaging apparatus can be measured.

The configuration can be arranged such that the signal processing circuit 8 performs all the above-described determinations and if any one of the results of the determinations is affirmative (YES in step S13 in FIG. 8), the processing advances to step S15. Alternatively, the configuration can be arranged such that the signal processing circuit 8 performs only one of the above-described determinations and if the result of the determination is affirmative (YES in step S13 in FIG. 8), the processing advances to step S15.

The following is a description of the processing in step S16 in FIG. 8. With respect to the through-display processing, the system control unit 14 performs control such that when the shutter switch SW1 (ON) is determined, the through-display processing performed before the shutter switch SW1 is pressed (ON) is continued as it is. Other operations are similar to those performed in the processing in step S6 in the first exemplary embodiment, and accordingly, a description thereof is not repeated here.

In the first exemplary embodiment and the second exemplary embodiment, the system control unit 14 performs control such that power is not supplied to the output amplifier 24. However, the configuration of the present invention is not limited to this. That is, the configuration of the present invention can be arranged as follows.

In the case where the image sensor 3 contains two-dimensionally arranged photoelectric conversion units and analog/digital converters arranged per each line of the photoelectric conversion units, power is not supplied to the analog/digital converters.

In the first exemplary embodiment and the second exemplary embodiment, the system control unit 14 performs control such that power is not supplied to the output amplifier 24. However, the configuration of the present invention is not limited to this. That is, the configuration can be arranged such that a level of power supply to the output amplifier 24 is reduced. That is, the configuration can be arranged such that in order to restrain (inhibit) supplying power to the output amplifier 24, power is not supplied to the output amplifier 24 or the level of power supply to the output amplifier 24 is reduced.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-032504 filed Feb. 9, 2006, which is hereby incorporated by reference herein in its entirety.

What is claimed:

1. An imaging apparatus comprising:
   an image sensor including a plurality of photoelectric conversion units, an output unit configured to output a signal from the plurality of photoelectric conversion units, and a reading unit configured to read the signal from the plurality of photoelectric conversion units via the output unit;
   a display unit configured to display image data from the image sensor; and
   a control unit configured to control a first operation in which image data serially read from the image sensor is displayed by the display unit as a serial image and a second operation in which a still image is shot according to an instruction for picking up the still image while the first operation is being performed, and further configured to inhibit supplying power to the output unit during a time period in which a dummy scanning in which the signal from the plurality of photoelectric conversion units is no read is being performed while the first operation is being performed,
   wherein the control unit is configured to control so that a ratio of a time period in which supplying power to the output unit is restrained or inhibited in the first operation during a time period in which a focusing operation is being performed becomes higher than a ratio of a time period in which supplying power to the output unit is restrained or inhibited in the first operation during a time period in which the focusing operation is not being performed.

2. The imaging apparatus according to claim 1, wherein the control unit is configured to restrained or inhibited supplying power to the output unit during a time period in which first image data is to be read while the first operation is being performed and to display previously read second image data instead of the first image data on the display unit.

3. The imaging apparatus according to claim 1, wherein the control unit is configured to control so that a ratio of a time period in which supplying power to the output unit is restrained or inhibited in the first operation while an object luminance is lower than a predetermined level becomes higher than a ratio of a time period in which supplying power to the output unit is restrained or inhibited in the first operation while the object luminance is not lower than the predetermined level.

4. The imaging apparatus according to claim 1, wherein the control unit is configured to control so that a ratio of a time period in which supplying power to the output unit is restrained or inhibited in the first operation while an object movement is smaller than a predetermined level becomes higher than a ratio of a time period in which supplying power to the output unit is restrained or inhibited in the first operation while the object movement is not smaller than the predetermined level.

5. The imaging apparatus according to claim 1, wherein the control unit is configured to control so that a ratio of a time period in which supplying power to the output unit is restrained or inhibited in the first operation while a temperature inside the imaging apparatus is higher than a predetermined temperature becomes higher than a ratio of a time period in which supplying power to the output unit is restrained or inhibited in the first operation while the temperature inside the imaging apparatus is not higher than the predetermined temperature.

6. The imaging apparatus according to claim 1, wherein the control unit is configured to control so that a ratio of a time period in which supplying power to the output unit is restrained or inhibited in the first operation while a temperature around the imaging apparatus is higher than a predetermined temperature becomes higher than a ratio of a time period in which supplying power to the output unit is restrained or inhibited in the first operation while the temperature around the imaging apparatus is not higher than the predetermined temperature.

7. The imaging apparatus according to claim 1, wherein the control unit is configured to control so that a ratio of a time period in which supplying power to the output unit is restrained or inhibited in the first operation while a time taken for performing the first operation has exceeded a predetermined length of time higher becomes than a ratio of a time period in which supplying power to the output unit is restrained or inhibited in the first operation while the time taken for performing the first operation has not yet reached the predetermined length of time.

8. The imaging apparatus according to claim 1, wherein the control unit is configured to control a third operation in which image data serially read from the image sensor is recorded on a recording medium as a moving image, and to perform control not to restrain or inhibit supplying power to the output unit while the third operation is being performed.

9. The imaging apparatus according to claim 1, wherein restraining or inhibiting supplying power to the control unit includes stopping supplying power to the output unit.

* * * * *